G. STENZEL.
VEHICLE REPAIR CLIP.
APPLICATION FILED JULY 6, 1915.
1,172,499.
Patented Feb. 22, 1916.
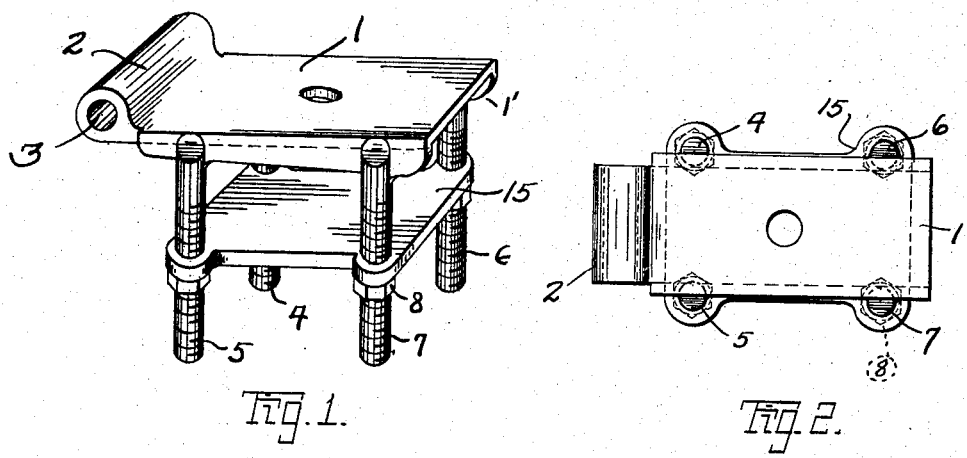
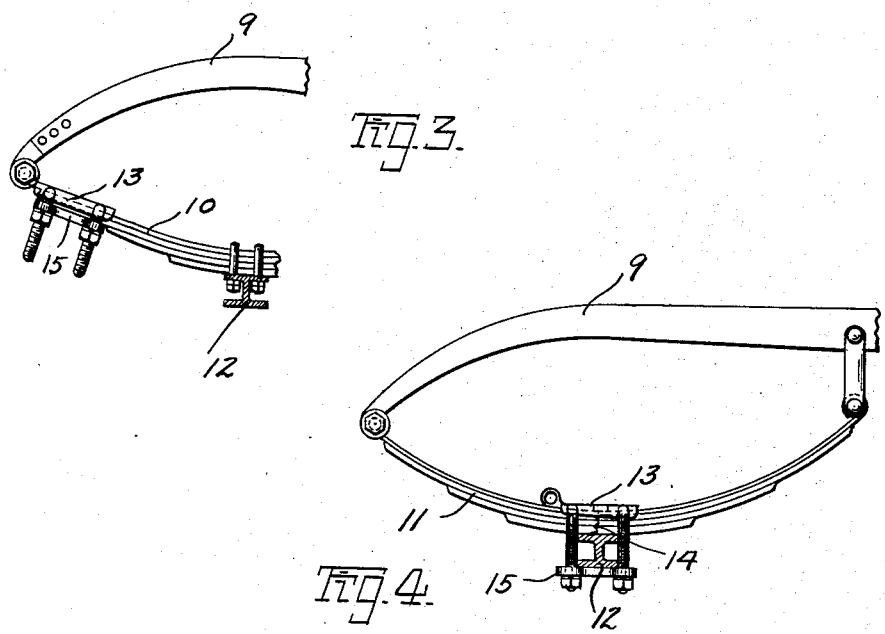
WITNESSES:
INVENTOR.
GUS STENZEL
BY
Carlos P. Griffin
ATTORNEY.

UNITED STATES PATENT OFFICE.

GUS STENZEL, OF IDRIA, CALIFORNIA.

VEHICLE-REPAIR CLIP.

1,172,499.  Specification of Letters Patent.  Patented Feb. 22, 1916.

Application filed July 6, 1915.  Serial No. 38,275.

*To all whom it may concern:*

Be it known that I, GUS STENZEL, a subject of the Empire of Germany, residing at Idria, in the county of San Benito, State of California, have invented a new and useful Vehicle-Repair Clip, of which the following is a specification in such full and clear terms as will enable those skilled in the art to construct and use the same.

This invention relates to a repair clip for elliptic or semi-elliptic springs and its object is to provide means whereby a spring may be repaired if broken, either in the middle or at the end of the spring.

An embodiment of the invention is shown in the drawing in which the same reference numeral is applied to the same portion throughout, but I am aware that there may be many modifications thereof.

Figure 1 is a perspective view of the repair clip, Fig. 2 is a plan view of the repair clip, Fig. 3 is a view of a broken spring repaired with this clip, and Fig. 4 is an illustration of a semi-elliptic spring broken over the axle and having this clip applied thereto for the temporary operation of the vehicle.

The numeral 1 indicates a plate which has a projection 2 extending transversely across one end thereof and through which a hole 3 is bored, said projection serving the same function as the hole or eye in the end of an elliptic or semi-elliptic spring. The plate is provided with four projecting bolts 4, 5, 6 and 7 which are integral therewith and which are spaced apart from each other transversely the width of the spring which is to be repaired with the clip, while the clips are spaced apart longitudinally the width of the axle upon which the spring may be used. Each of the bolts 5 to 7 inclusive is provided with a nut 8 for securing the clip to the spring.

In Figs. 3 and 4 the numeral 9 indicates the frame of the vehicle to which the springs 10 and 11 are connected. The numeral 12 indicates the vehicle axle and 13 the clip applied to the end of the spring where the eye is on the top leaf, while in Fig. 4 the spring is broken at 14 and the clip 13 is applied thereto immediately over the axle 12, the length of the plate 1 being sufficient to hold the several parts of the spring together for temporary running of the vehicle. A solid plate 15 is used in the place of a plurality of washers, lock washers being used under each nut.

It is to be observed that each side of the plate 1 is provided with a depending flange as indicated at 1', the object of which is to assist in securing the plate in place on the springs, as well as to give the bolts which are integral therewith greater strength in their connection with the springs.

Having thus described my invention what I claim as new and desire to secure by Letters Patent of the United States, is as follows, modifications within the scope of the claims being expressly reserved:

A vehicle spring repair plate comprising a plate having an eye extending transversely across one end and integral flanges at the sides thereof, four bolts integral with the flanges and plate for securing the plate to the spring of a vehicle, and bolts extending at right angles to the plane of the plate.

In testimony whereof I have hereunto set my hand June, A. D. 1915, in the presence of the two subscribed witnesses.

GUS STENZEL.

Witnesses:
 H. J. BYLES,
 C. E. LINK.

Copies of this patent may be obtained for five cents each, by addressing the "Commissioner of Patents, Washington, D. C."